United States Patent [19]
Lehman

[11] Patent Number: 5,837,021
[45] Date of Patent: Nov. 17, 1998

[54] INSTALLATION FOR THE TREATMENT OF AT LEAST ONE FLUID, BY PASSAGE THROUGH TWO ADJACENT MASSES OF MATERIAL

[75] Inventor: Jean-Yves Lehman, Maisons-Alfort, France

[73] Assignee: L'Air Liquide, Societe Anonyme Pour l'Etude et l'Exploitation des Procedes Georges Claude, Paris Cedex, France

[21] Appl. No.: 597,185

[22] Filed: Feb. 6, 1996

Related U.S. Application Data

[63] Continuation-in-part of Ser. No. 389,804, Feb. 16, 1995, abandoned.

[30] Foreign Application Priority Data

Dec. 9, 1994 [FR] France .................................. 94 14825

[51] Int. Cl.$^6$ .................................................. B01D 53/04
[52] U.S. Cl. .............................. 55/486; 55/517; 95/130; 96/131; 96/151
[58] Field of Search ........................... 55/262, 474, 475, 55/479, 486, 517; 95/130; 96/121, 131, 132, 135, 138, 151, 154

[56] References Cited

U.S. PATENT DOCUMENTS

| | | | |
|---|---|---|---|
| 1,170,526 | 2/1916 | Gaither | 96/132 |
| 2,614,650 | 10/1952 | Chandler et al. | 96/131 |
| 3,103,425 | 9/1963 | Meyer | 96/131 |
| 3,731,678 | 5/1973 | Pyzel | 96/132 |
| 4,290,785 | 9/1981 | Alldredge | 55/475 |
| 4,482,358 | 11/1984 | Hsieh et al. | 55/474 |
| 4,698,072 | 10/1987 | Rohde et al. | 96/131 |
| 4,725,290 | 2/1988 | Ohlmeyer et al. | 96/131 |
| 5,176,721 | 1/1993 | Hay et al. | 55/475 |

FOREIGN PATENT DOCUMENTS

| | | | |
|---|---|---|---|
| 0 118 349 | 9/1984 | European Pat. Off. | |
| 0 482 991 | 4/1992 | European Pat. Off. | |
| 0 483 975 | 5/1992 | European Pat. Off. | |
| 0 596 256 | 5/1994 | European Pat. Off. | |
| 27 34 608 | 2/1979 | Germany | 96/131 |
| 52-72373 | 6/1977 | Japan | 96/132 |
| 59-127605 | 7/1984 | Japan | 96/132 |
| 62-033519 | 2/1987 | Japan | 55/262 |
| 5-228356 | 9/1993 | Japan. | |
| 2 168 330 | 6/1986 | United Kingdom. | |

*Primary Examiner*—C. Scott Bushey
*Attorney, Agent, or Firm*—Young & Thompson

[57] ABSTRACT

An installation for the treatment of fluid having a receptacle (1) defining a non-vertical portion of a path for fluid through at least two adjacent masses (A; B; C) of particulate materials, typically different from each other, each mass being in direct contact with its neighbor or neighbors, without the interposition of a separating grid. The installation is particularly useful for the separation or drying of air.

15 Claims, 5 Drawing Sheets

INSTALLATION FOR THE TREATMENT OF AT LEAST ONE FLUID, BY PASSAGE THROUGH TWO ADJACENT MASSES OF MATERIAL

CROSS-REFERENCE TO RELATED APPLICATION

This application is a continuation-in-part of pending application Ser. No. 08/389,804 filed Feb. 16, 1995, now abandoned.

FIELD OF THE INVENTION

The present invention relates to installations for the treatment of at least one fluid, of the type comprising at least one receptacle defining a non-vertical portion of a fluid path through at least two masses of adjacent particulate material disposed in the receptacle.

BACKGROUND OF THE INVENTION

Installations of this type find widespread application in the art, with particulate materials such as catalysts and/or adsorbents. In most of the these uses, obtaining optimal performance depends on the constant thickness of each mass of particulate material in the direction of fluid flow, which is to say the geometric precision of the interface between two adjacent layers. Until now, particularly in installations with masses of concentric different adsorbents, this interfacial precision requires the emplacement, which is delicate and difficult, of an intermediate grid, as described in EP-A-0,118,349.

SUMMARY OF THE INVENTION

The present invention has for its object to provide a simplified installation for the treatment of fluid, with considerably reduced capital costs and offering great flexibility of use and numerous possibilities for optimization.

To do this, according to one characteristic of the invention, the two adjacent masses of particulate material are in direct contact with each other in an interfacial region, typically substantially vertical, substantially flat or preferably substantially cylindrical.

In the present invention, by "direct contact in an interfacial zone", is intended an interfacial zone without mixing, or with slight mixing for a slight depth, free from any wall or partition interposed between the two adjacent masses.

BRIEF DESCRIPTION OF THE DRAWINGS

The present invention has for another object industrial uses of such installations, particularly for the treatment of air flow, for example the drying and/or separation of at least one gaseous constituent of an air flow.

Other characteristics and advantages of the present invention will become apparent from the following description of embodiments given by way of non-limiting example, with respect to the accompanying drawings, in which.

DETAILED DESCRIPTION OF THE INVENTION

Figure 1:
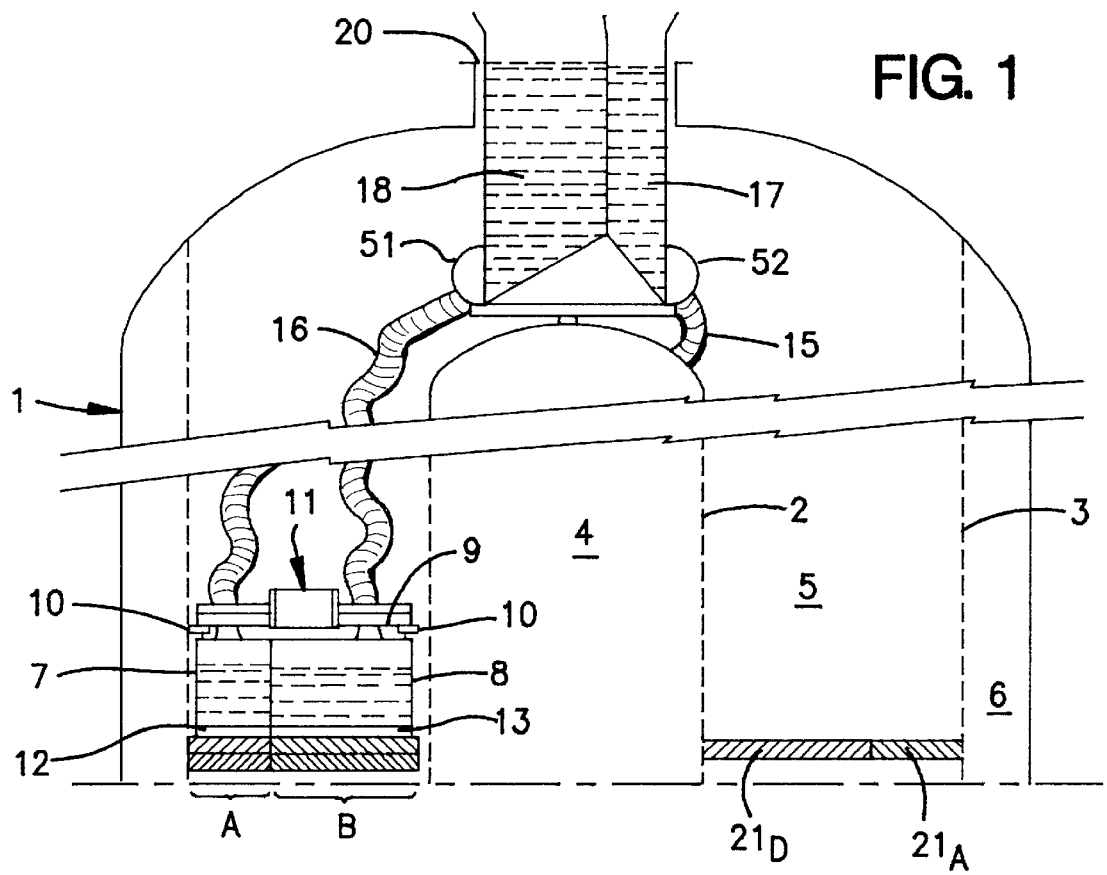
FIG. 1 is a schematic vertical cross-sectional view of an installation for treatment according to the invention in the course of loading according to one embodiment of the installation.

In the description which follows and the drawings, identical or analogous elements bear the same reference numerals, primed as may be.

In FIG. 1 there is shown a receptacle 1 of an installation for purification by adsorption of the type described in EP-A-0,118,349 mentioned above, defining an internal closed volume with a vertical axis divided internally by a tubular central grid 2 and a tubular concentric peripheral grid 3 into a central volume 4, an annular intermediate volume 5, and a concentric annular peripheral volume 6, the annular intermediate volume 5 being filled with at least one, and in this case two masses of adsorbent A, B, traversed successively by the gas flowing radially between the volumes 4 and 6 and, according to the invention, having no intermediate grid. For the purification of air before its distillation or for the separation of air by so-called adsorption techniques by pressure variation (PSA or VSA), the adsorbents A and B are generally constituted of particulate materials that differ from each other according to their composition and/or their granulometry, typically of particles of alumina and/or zeolite, respectively.

In the embodiment shown in FIG. 1, an apparatus for using adsorbent masses A and B according to a process of the present invention comprises two side-by-side diffusing devices 7 and 8 of an overall width less than the radial width of the intermediate volume 5 and secured to a frame 9 comprising drive means, for example rollers 10 bearing radially on the walls of the grids 2 and 3 and driven in rotation by a motor 11 carried by the frame. Each diffusion device 7, 8 comprises a principal portion forming a particulate material reserve prolonged downwardly and rearwardly in a rear thinner portion terminating in a distribution mouth 12, 13, respectively, the lower anterior surface of each device 7, 8 having for example a profile of a rounded shoe 14 prolonged rearwardly by a horizontal support surface terminating at the pouring mouth 12, 13. In the illustrated embodiment, the principal portions of the diffusing devices 7 and 8 are connected by telescopic or flexible conduits 15 and 16, respectively, to reservoirs 17 and 18 of particulate material supported rotatably at 19 on the upper imperforate end of the central grid 2. The reservoirs 17 and 18 as well as the diffusing devices 7 and 8 are so dimensioned as to be able to pass through an access opening 20 formed preferably axially in the upper end of the shell of the receptacle 1, so as to be withdrawn after filling the intermediate volume 5.

Figure 2:
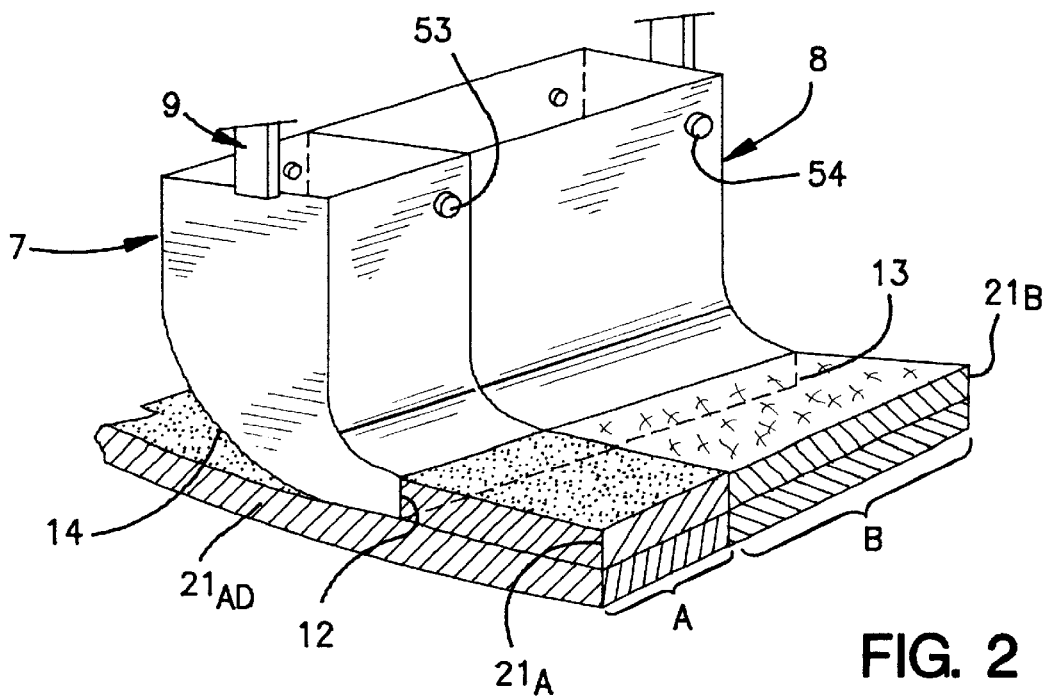
FIG. 2 is a schematic perspective view of the double pouring device of FIG. 1.

As will be seen clearly in FIG. 2, each diffusing device 7, 8leaves behind it, when it is moved in the direction away from the mouths 12, 13, a continuous strip 21A, 21B of particulate material having a cross section corresponding to that of the depositing mouth 12, 13, and hence of constant thickness. Thus, by turning the diffusing devices 7 and 8 in the intermediate chamber 5, they deposit at each revolution a layer of two adjacent strips 21A, 21B of the same thickness occupying all the radial width of the intermediate volume 5. With each new revolution, the diffusing devices 7 and 8, bearing on the layer previously deposited and sliding on this latter, deposit progressively a new layer, so as to build up the height of the intermediate volume 5, after which the diffusing devices and the reservoirs 17 and 18 are withdrawn and the blocking and/or sealing means are emplaced, at the top of the intermediate volume 5, to prevent in use local phenomena of bypassing the fluid or fluidization of the masses A and B.

As will also be seen in FIG. 2, the process for producing an installation according to the invention permits emplacing side by side at least two different adsorbent beds, of different material or of the same material having different granulometries, without having to provide according to the invention any separating or containing grid between the masses of particulate materials. Thus, the simultaneous side-by-side spreading in this embodiment of the strips 21A, 21B, of constant controlled thickness, in practice between 1 and 20 cm, avoids problems of sloping at the edges and limits, even with very fluid particulate materials, the problems of mixing between two adjacent strips, this mixing zone being of the order of the width of the slope, which is to say of the order of three times the thickness of the spread strip if spreading is sequential, or a value which is substantially less if the spreading is, as in this preferred embodiment, simultaneous.

Figure 3:
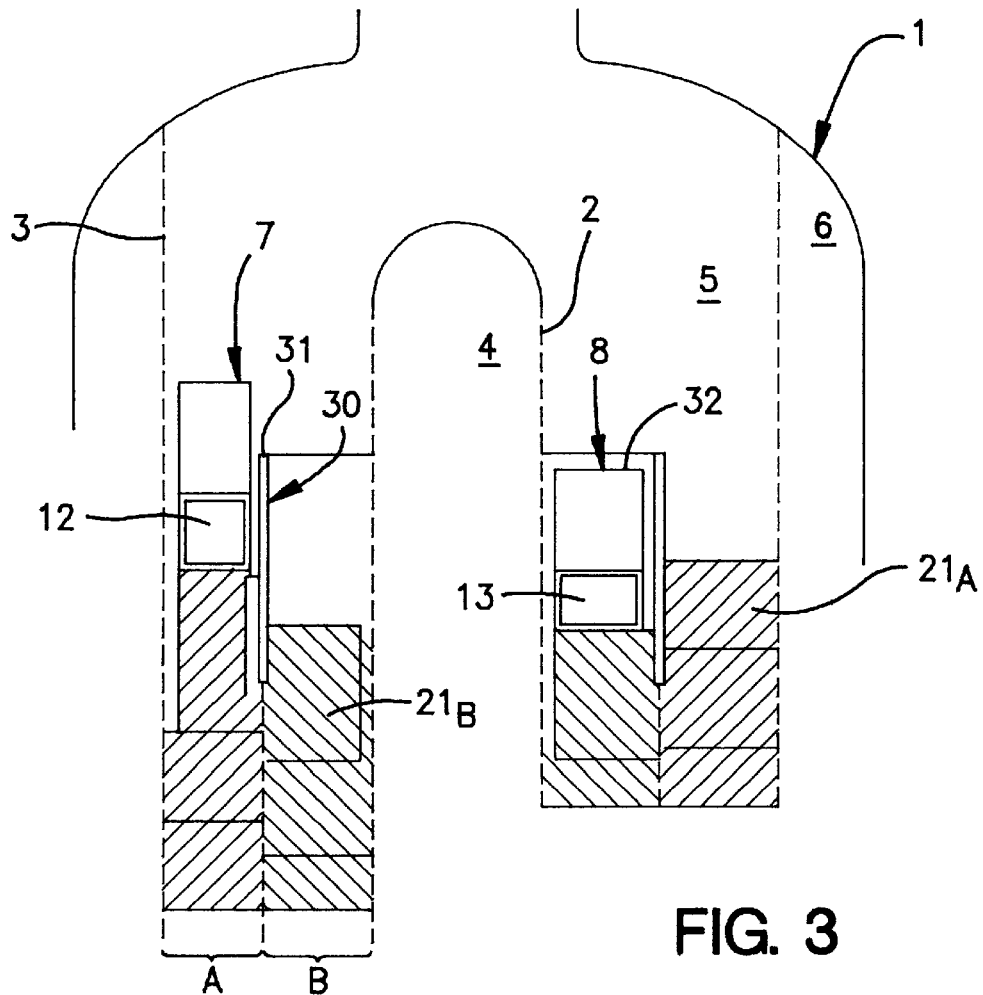
FIGS. 3 and 4 are views similar to FIG. 1 showing modified embodiments of the invention.
Figure 4:
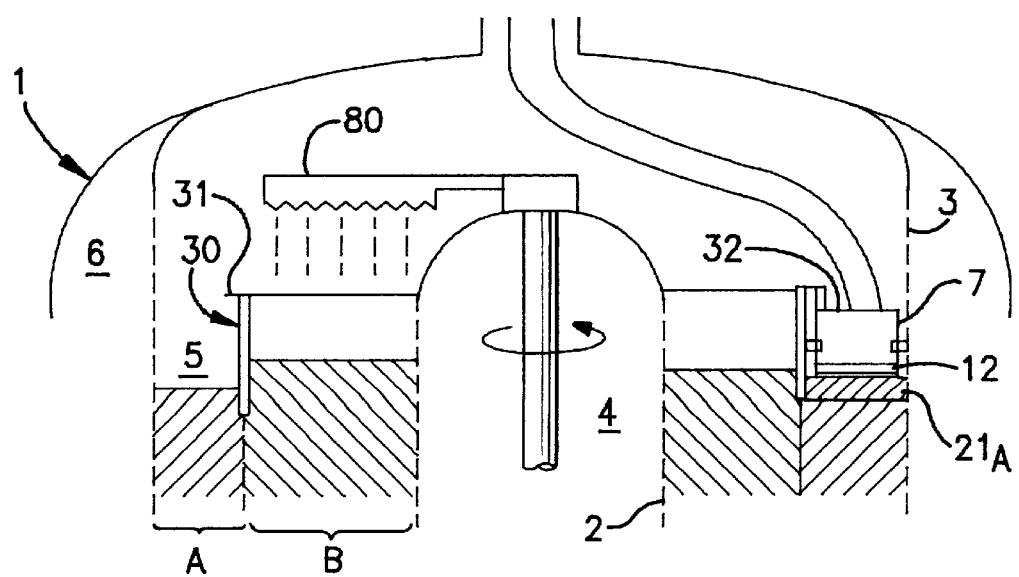

There is shown in FIGS. 3 and 4 embodiments of filling permitting giving freedom from the requirement to deposit simultaneously or semi-simultaneously and using a sliding barrier 30 of low height, therefore disposable in the height of the receptacle at the end of the filling phase and moving vertically with the deposit of the layers of particulate material, thereby achieving, by elimination of the slope, the same precise interface upon sequential spreading or deposition as for simultaneous spreading, as previously described. There is shown in FIG. 3 the two spreading devices 7 and 8 of FIG. 1, here separate and independent, as permitted by the sliding barrier 30, but synchronized in their operation. A sliding barrier 30 is present in the form of a section of tube disposed concentrically within the space 5 and having an axial height greater than 1.5 times the axial height of the least high mouth (13) of the spreading devices 7, 8, between which it extends. Preferably, the upper end of the barrier 30 comprises a radial flange 31 bearing on a turning member 32 at the top of one of the spreading devices so as to be displaced axially simultaneously with this latter, the other spreading device being actuated in rotation in synchronism with the first. Preferably, each resulting mass has a height greater than approximately four times its horizontal thickness.

The embodiment of FIG. 4 is different from that of FIG. 3 by the fact that the filling of one of the masses of particulate material, in this instance the internal mass B, is here effected by pouring from above, as permitted by the sliding barrier 30, via a manifold 80 displaced in rotation in synchronism with the deposition, by a spreading device 7 such as described above, of strata of constant thickness according to the processes of FIGS. 1 and 3.

Figure 5:
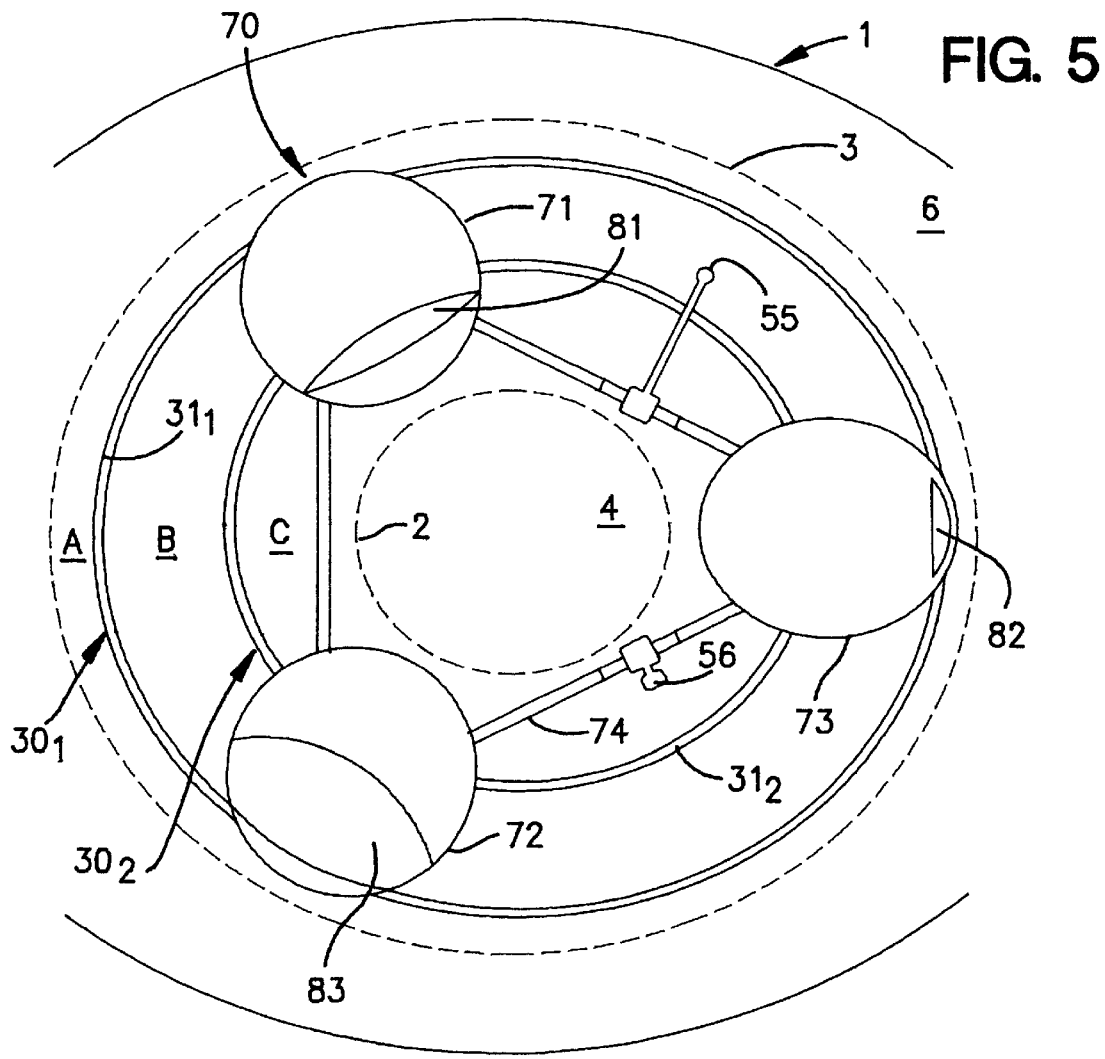
FIG. 5 is a schematic plan view of another embodiment of the invention.
Figure 6:
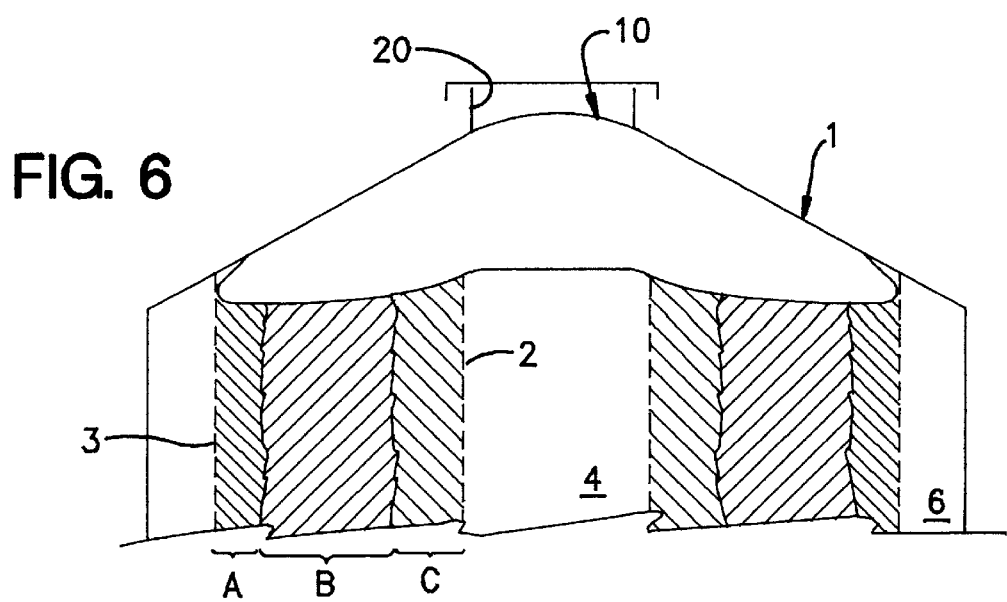
FIG. 6 is a schematic cross-sectional view of an installation according to FIG. 5.

There is shown in FIG. 5 a device with two sliding barriers for loading three masses of concentric particulate material in the internal volume defined between the interior and exterior grids 2 and 3. As shown in FIG. 5, the device comprises a rotating device 70, displaceable axially by being preferably suspended at the top of the receptacle 1, with three pouring hoppers 71, 72, 73, connected by transverse arms 74 and provided with members that roll or bear with low friction coacting with the radial flanges $31_1$ and $31_2$ of two concentric tubular sliding barriers $30_1$, $30_2$, separating the volumes of the three concentric adsorbent masses A, B, C. The dispensing hoppers 71–73, fed by supplies turning with the device as in the embodiment of FIG. 1, comprise lower pouring openings 81, 82, 83, opening respectively into the annular spaces between the internal barrier $31_2$ and the internal grid 2, between the barriers $31_2$ and $31_1$, and between the external barrier $31_1$ and the external grid 3. After filling the zone between the grids 2 and 3, the device 10 is demounted and removed from the receptacle 1 through the opening 20, then the upper volume above the masses A, B, C is at least partially occupied by one or several containing devices for the upper parts of the masses A–C, for example via an inflatable member 40 connectible to a source of gas under pressure.

As will be understood from the above, the principal technical problem resides in the provision of at least two homogeneous masses of particulate material within the volume confined by the adsorber, more particularly when the masses are annular and concentric: it is necessary thus to maintain the levels of the particulate material within the receptacle volume or in the spreading devices within narrow limits (the height of the successive layers in the modifications according to FIGS. 1 and 2, the height of the sliding barrier in the modifications of FIGS. 3 to 5, the height of the hopper of the diffusing device). These heights are thus necessarily limited by the need to be able to remove the pouring or spreading devices from the receptacle at the end of filling or to leave them within a volume or within the height of this latter without their impairing the good operation of the installation. It is therefore difficult, apart from installations with receptacles of small dimensions which can be assembled in a factory, to effect the filling of an upwardly open receptacle, which permits the use of at least one sliding barrier having a height greater than a third of that of the grids 2 and 3, that can be removed after complete filling of the receptacle whose upper end will then be welded or assembled by a ring on the peripheral edge. According to the invention, the flow of each particulate material emplaced within the receptacle must be adapted at all times so as to maintain homogeneous levels. To this end, the pouring/diffusing devices should comprise at least a control means for the flow rate of the particulate material, typically upstream of the spreading device, for example withdrawal devices with valves or lugs, as shown at 51 and 52 in FIG. 1, means for measuring the level of the particulate material in the spreading hoppers, for example, photoelectric cells as shown at 53 and 54 in FIG. 2, or reflective devices, particularly ultrasonic, as shown in 55 and 56 in FIG. 5.

Figure 7:
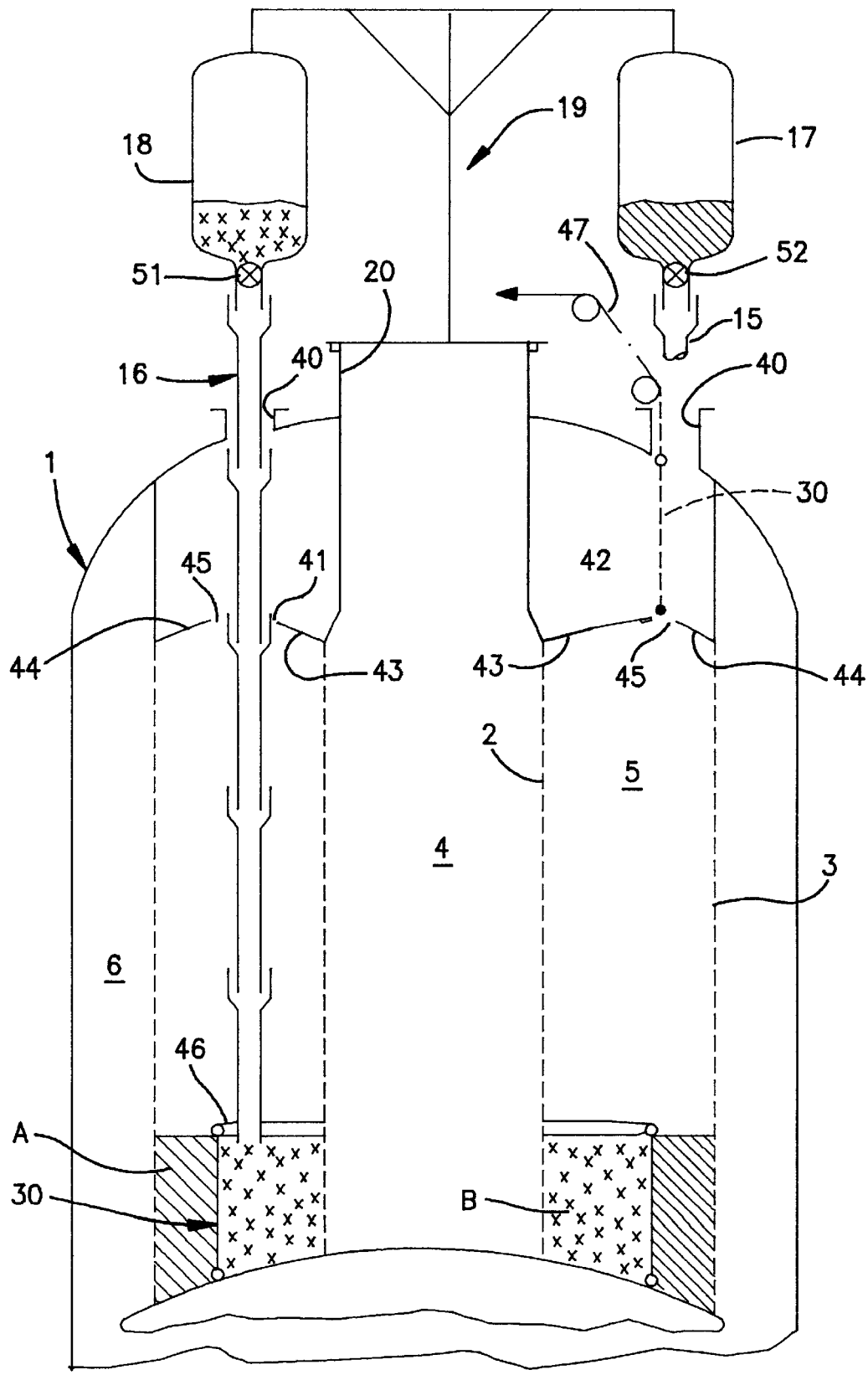
FIG. 7 is another alternative embodiment of an installation according to the invention.

Represented in FIG. 7 is another alternative embodiment of concentric annular beds in a concentric-bed plant similar to the previous ones. Shown again here are the particulate-material reservoirs 17 and 18 and their rotary support 19, in this case of the supported-arm type, which are arranged, in this case, outside the container 1, each discharging via a hose or telescopic pipe 15, 16, respectively, into the adjacent annular spaces delimited, in the intermediate annular volume 5 between the perforated walls 2 and 3, by a shell forming a slip form 30.

As may be seen on the left-hand part of FIG. 7, the lower end of each pipe, respectively 16 and 15, emerges slightly below the upper end of the form 30 and is fastened to the latter, in a disconnectible manner, at 46. Thus, by discharging a quantity of particulate material greater than the free volume formed by the slip form, this volume is filled until the mass of particulate material is flush with the end of the pipe 15, 16, which thus interrupts the filling of the said volume. The discharge is then interrupted by the valves 51, 52 and the form shell 30 is raised, for example by cables 47 passing through the passages 40 and the openings 41, 42, through a height less than the height of the shell itself, that is to say with its lower end still immersed in the previously deposited layers of particulate materials, the lower ends of the pipes 15 and 16 accompanying this movement and remaining in position with respect to the shell 30 for a new charging step.

In the embodiment in FIG. 7, the pipes 15 and 16 extend through filling orifices 40 formed in the upper wall of the container 1, vertically in line with the annular space 5 and angularly distributed around the axis of the container 1, and through openings 41, 42 formed in deflecting plates 43 and 44 converging typically on each other as a V, leaving an annular passage 45 at their vertex and forming the upper boundary of the active part of the annular beds A and B guiding the flows of fluid, in this zone, through these beds. When the shell 30, after the end of raising, has reached the level of the deflecting plates 43 and 44, it is pulled up, in the example shown, through the annular space 45 between the facing ends of these deflecting plates and remains permanently housed in the upper end of the container 1 in the configuration shown by dotted lines at the top of the right-hand part of FIG. 7. The openings 41 and 42 in the plates 43 and 44 are closed off and then reserves of particulate materials are poured in via the shortened pipes 15 and 16 above the deflecting plates 44, 43 which remain separated by the shell 30 immobilized in its upper position. Filling is completed by discharging the particulate materials directly via the orifices 40 on either side of the shell 30, after which the pipes 15 and 16, the reservoirs 17 and 18 and their support 19 are removed, the passages 40 closed off and the container placed in the operational condition.

Figure 8:
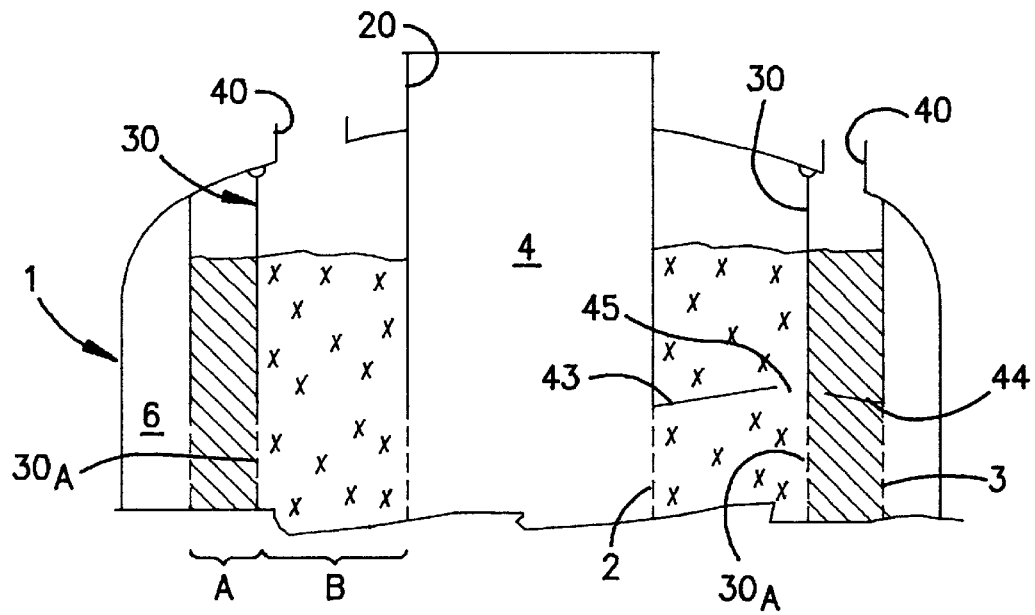
FIG. 8 depicts a container in the completely filled configuration.

In the embodiment in FIG. 8, which represents a container in the completely filled configuration, the slip form 30 includes a gas-"transparent" lower part 30A, typically in the form of sandwiches of meshes, which does not disrupt the production of a distinct interfacial zone between two contiguous beds. In this case, as shown in the right-hand part in FIG. 8, the said meshed lower part can remain immersed in the operational zone of the beds A and B, beneath the deflectors 43, 44. Optionally, as shown in the left-hand part in FIG. 7, the deflectors may be omitted, the upper "solid" part of the form 30, also immersed in the masses A and B, forming an obstacle and preventing short-circuiting passages of fluid via the top of the beds.

Figure 9:
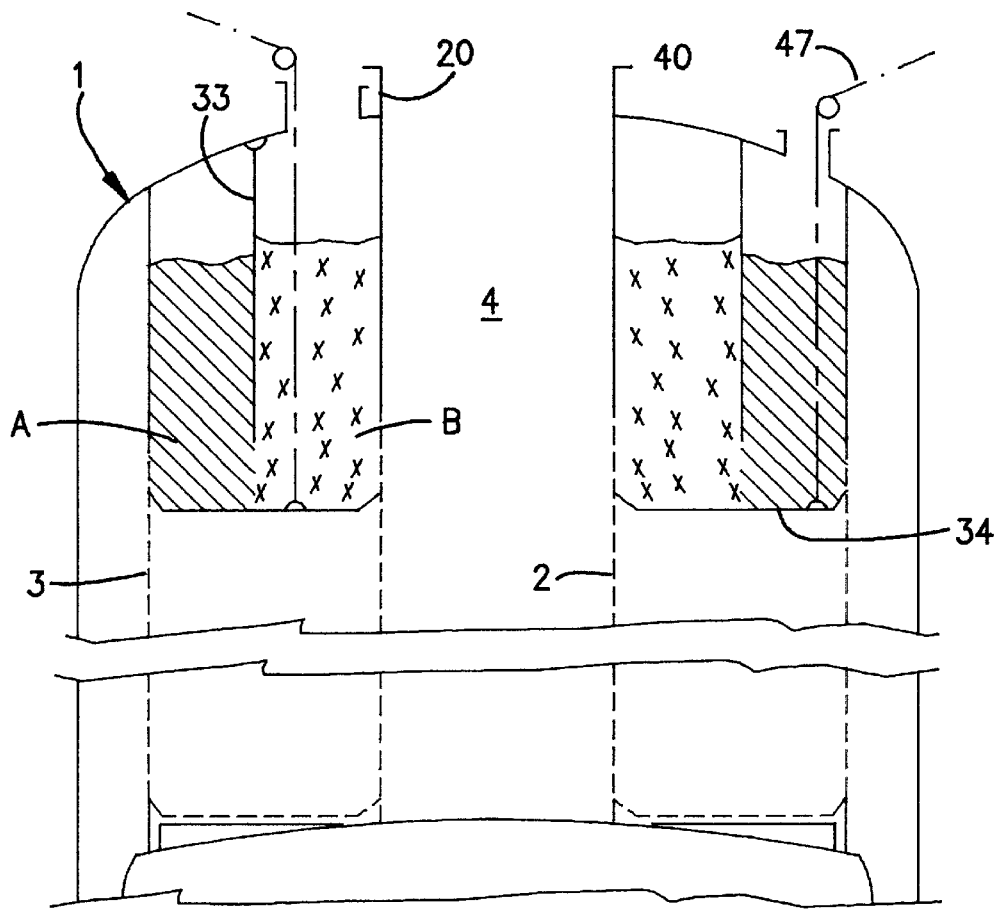
FIG. 9 depicts a container at the start of filling.

Illustrated in FIG. 9, which represents a container at the start of filling, is another embodiment of contiguous vertical layers of differentiated materials without a separating screen according to the invention. In this case, the materials are discharged, in synchronism, directly into the annular chambers beneath the filling orifices 40. These chambers are initially delimited by a shell 33 of defined height, the upper edge of which is fixed to the roof of the container and, permanently, to their lower end, by an annular bottom wall 34 which can slide in a sealed manner along the inner 2 and outer 3 containing screens, and which is retained, during its descent, by cables 47. The bottom wall 34 is progressively lowered until it ends up resting on the bottom structure of the container 1, as shown by dotted lines in the lower part of FIG. 9. It will be understood that, in this embodiment, the strata of adjacent beds, formed on either side of the shell 33 "descend" progressively with the bottom 34, while being maintained contiguous and guided by the screens 2 and 3. When the container is completely filled, the shell 33, which extends as far as the upper level of the "let-through" zones of the containing screens 2 and 3, acts as an anti-bypass baffle, in the manner of the form 30 of the embodiments in FIGS. 7 and 8.

Although the present invention has been described with respect to particular embodiments, it is not thereby limited but on the contrary is susceptible to modifications and variations which will be apparent to one skilled in the art. Thus, the process of FIGS. 1 and 2 can be used to deposit sequentially parallel strips in vertical non-cylindrical treatment installations, particularly to provide therein a plurality of adjacent masses of particulate materials of small thickness and having different granulometries.

What is claimed is:

1. An apparatus for treating at least one fluid, comprising a container defining at least one non-vertical fluid circulation path for causing the at least one fluid to pass through at least two vertically arranged adjacent masses of particulate materials, said two adjacent masses being in direct contact with each other along a substantially vertical interface zone, said interface zone extending along more than one vertical plane.

2. The apparatus of claim 1, wherein said interface zone has a vertical axis of symmetry.

3. The apparatus of claim 1, wherein said interface zone includes at least one curved part.

4. The apparatus of claim 3, wherein said interface zone includes at least one part having a cylindrical shape.

5. The apparatus of claim 4, wherein the adjacent masses are concentric.

6. The apparatus of claim 1, wherein the particulate material of at least one of masses is an adsorbent for at least one component of the fluid to be treated.

7. The apparatus of claim 6, wherein the adsorbent is predominantly nitrogen-adsorbing.

8. An apparatus for treating at least one fluid, in a vertically extending vessel, comprising: a first vertically extending chamber and a second vertically extending chamber, the first and second chambers separated by at least two adjacent vertically extending masses of particulate material through which pass the at least one fluid circulating from the first chamber to the second chamber along a substantially horizontal circulation path, the two adjacent masses being in direct contact with each other along a contact interface zone, the interface zone extending in more than one plane, each mass having a horizontal thickness along the circulation path less than ¼ of its maximum transverse dimension perpendicular to the circulation path.

9. The apparatus of claim 8, wherein the interface zone includes at least one curved part.

10. The apparatus of claim 9, wherein at least adjacent portions of the adjacent masses have a common vertical symmetry plane.

11. The apparatus of claim 10, wherein the adjacent masses have a common vertical symmetry axis.

12. The apparatus of claim 8, wherein the adjacent masses are retained between vertically extending screens.

13. The apparatus of claim 8, wherein at least one of the masses include adsorbent material for adsorbing at least one component of the fluid to be treated.

14. The apparatus of claim 13, wherein said adsorbent material is a zeolite.

15. The apparatus of claim 1, wherein the adjacent masses are retained between vertically extending screens.

* * * * *